US011132733B2

(12) United States Patent
Srinivasan et al.

(10) Patent No.: US 11,132,733 B2
(45) Date of Patent: Sep. 28, 2021

(54) PERSONALIZED RECOMMENDATIONS FOR UNIDENTIFIED USERS BASED ON WEB BROWSING CONTEXT

(71) Applicant: Target Brands, Inc., Minneapolis, MN (US)

(72) Inventors: Aarthi Srinivasan, Los Altos, CA (US); Venkataramana Bantwal Kini, Sunnyvale, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 360 days.

(21) Appl. No.: 15/990,363

(22) Filed: May 25, 2018

(65) Prior Publication Data

US 2019/0362408 A1 Nov. 28, 2019

(51) Int. Cl.
*G06Q 30/00* (2012.01)
*G06Q 30/06* (2012.01)
*G06F 16/955* (2019.01)
*G06F 16/9535* (2019.01)

(52) U.S. Cl.
CPC ....... *G06Q 30/0631* (2013.01); *G06F 16/955* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 6,771,290 B1 * | 8/2004 | Hoyle | | G06F 8/60 715/745 |
| 8,468,164 B1 | 6/2013 | Paleja et al. | | |
| 9,904,949 B1 * | 2/2018 | Tavernier | | G06Q 30/0631 |
| 10,504,192 B2 * | 12/2019 | Mason | | G06Q 10/10 |
| 2003/0105682 A1 | 6/2003 | Dicker et al. | | |
| 2010/0169158 A1 * | 7/2010 | Agarwal | | G06Q 10/063 705/7.11 |
| 2012/0191626 A1 * | 7/2012 | Ahn | | G06Q 40/06 705/36 R |

(Continued)

FOREIGN PATENT DOCUMENTS

| | | |
|---|---|---|
| JP | 2009-129298 A | 6/2009 |
| KR | 10-2009-0000274 A | 1/2009 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Merchant & Gould P.C.

(57) ABSTRACT

Methods and systems for recommending items to an unknown user of a website are disclosed. In one aspect, browsing activity of known users is analyzed to determine which items or categories of items are most popular in a given context (time, place, device, etc.). The known user browsing activity (clickstream data) is used to generate a multi-dimensional attribute matrix. Matrix factorization and clustering are used to generate affinity scores for items based on user context. These scores are used to generate item recommendations for an unknown user in a particular browsing context. In some embodiments, personalized item recommendations are updated based on interactions made between the unknown user and content of the website.

26 Claims, 12 Drawing Sheets

(56) References Cited

U.S. PATENT DOCUMENTS

| | | |
|---|---|---|
| 2012/0323674 A1 | 12/2012 | Simmons et al. |
| 2014/0188865 A1* | 7/2014 | Karatzoglou ...... G06Q 30/0282 707/732 |
| 2015/0120417 A1 | 4/2015 | Kim |
| 2015/0262282 A1 | 9/2015 | Walti et al. |
| 2016/0275594 A1* | 9/2016 | Mullakkara Azhuvath ................ G06F 16/24578 |
| 2017/0083522 A1 | 3/2017 | Somekh et al. |
| 2017/0083916 A1* | 3/2017 | Fadli ............... G06Q 30/0246 |
| 2017/0132509 A1 | 5/2017 | Li et al. |
| 2017/0262903 A1* | 9/2017 | Burnett ............. G06Q 30/0277 |
| 2019/0163829 A1* | 5/2019 | Puri ................... G06F 16/9536 |
| 2019/0243883 A1* | 8/2019 | Vangen .............. G06F 16/9577 |

FOREIGN PATENT DOCUMENTS

| | | |
|---|---|---|
| KR | 10-2012-0075515 A | 7/2012 |
| KR | 10-2016-0025140 A | 3/2016 |
| WO | 2014/178536 A1 | 11/2014 |

OTHER PUBLICATIONS

Hongzhi Yin et al; "SPTF: A Scalable Probabilistic Tensor Factorization Model for Semantic-Aware Behavior Prediction"; 2017; 2017 IEEE International Conference on Data Mining (Year: 2017).*

Vineeth Rakesh Mohan; "Probabilistic Personalized Recommendation Models for Heterogeneous Social Data"; 2017; Wayne State University, Detroit, Michigan (Year: 2017).*

Wenmin Wu et al; "Improving performance of tensor-based context-aware recommenders using Bias Tensor Factorization with context feature auto-encoding"; Jul. 15, 2017; Science Direct (Year: 2017).*

International Search Report and Written Opinion for Application No. PCT/US2019/033819 dated Oct. 1, 2019.

International Search Report and Written Opinion for Application No. PCT/US2019/033822 dated Oct. 7, 2019.

* cited by examiner

|  | P1 | P2 | P3 | P4 | P5 | P6 | P7 | P8 | P9 | P10 |
|---|---|---|---|---|---|---|---|---|---|---|
| G1 | Buy | A2C | View | | | | | | | |
| G2 | | Buy | Buy | View | | | | | | |
| G3 | | View | View | View | Buy | | | | | |
| G4 | | | | View | | A2C | Buy | View | | |
| G5 | | | | | View | | A2C | | | |
| G6 | | | | | Buy | Buy | A2C | View | | |
| G7 | | | | | View | | | | | |
| G8 | | | | | | | View | View | View | View |
| G9 | | | | | | | View | View | Buy | Buy |
| G10 | | | | | | | | A2C | Buy | Buy |

FIG. 7A

| | P1 | P2 | P3 | P4 | P5 | P6 | P7 | P8 | P9 | P10 |
|---|---|---|---|---|---|---|---|---|---|---|
| G1 | 10 | 5 | 2 | ? | ? | ? | ? | ? | ? | ? |
| G2 | ? | 10 | 10 | ? | ? | ? | ? | ? | ? | ? |
| G3 | ? | 2 | 2 | 2 | 10 | ? | ? | ? | ? | ? |
| G4 | ? | 2 | ? | 2 | ? | 5 | 10 | ? | ? | ? |
| G5 | ? | ? | ? | ? | 2 | ? | 5 | 2 | ? | ? |
| G6 | ? | ? | ? | ? | 10 | 10 | 5 | ? | ? | ? |
| G7 | ? | ? | ? | ? | 2 | ? | ? | 2 | ? | 2 |
| G8 | ? | ? | ? | ? | ? | ? | 2 | 2 | 2 | 2 |
| G9 | ? | ? | ? | ? | ? | ? | 2 | ? | 10 | 10 |
| G10 | ? | ? | ? | ? | ? | ? | ? | 5 | 10 | ? |

FIG. 7B

| U | | 718 | | |
|---|---|---|---|---|
| u1 | 1.516 | -0.24 | -0.87 | 1.18 |
| u2 | 2.009 | -0.88 | -0.77 | 2.343 |
| u3 | -1.03 | -0.23 | 1.072 | 2.175 |
| u4 | 0.328 | 2.679 | -1.17 | 0.188 |
| u5 | 0.008 | 1.025 | -0.16 | 0.301 |
| u6 | -1.52 | 2.148 | 0.399 | 2.123 |
| u7 | -0.25 | 0.006 | 0.335 | 0.34 |
| u8 | 0.488 | 0.595 | 0.41 | -0.07 |
| u9 | 1.844 | 1.225 | 2.401 | -0.31 |
| u10 | 1.117 | 0.467 | 1.948 | -0.13 |

| V | | 720 | | | Cluster |
|---|---|---|---|---|---|
| v1 | 1.071 | -0.05 | -0.7 | 0.658 | Cluster 1 |
| v2 | 1.689 | -0.68 | -0.68 | 2.031 | Cluster 1 |
| v3 | 1.368 | -0.67 | -0.47 | 1.834 | Cluster 1 |
| v4 | -0.07 | 0.272 | -0.03 | 0.248 | Cluster 2 |
| v5 | -1.87 | 0.648 | 1.344 | 2.655 | Cluster 2 |
| v6 | -0.72 | 2.02 | -0.3 | 1.071 | Cluster 2 |
| v7 | 0.353 | 2.974 | -0.84 | 0.38 | Cluster 2 |
| v8 | 0.346 | 0.272 | 0.683 | 0.025 | Cluster 3 |
| v9 | 1.789 | 0.902 | 2.738 | -0.27 | Cluster 3 |
| v10 | 1.181 | 0.742 | 1.469 | -0.23 | Cluster 3 |

FIG. 7C

PERSONALIZED RECOMMENDATIONS FOR UNIDENTIFIED USERS BASED ON WEB BROWSING CONTEXT

TECHNICAL FIELD

The present disclosure relates generally to presenting personalized item recommendations to users of a website based on browsing context.

BACKGROUND

Content providers for websites often use previous browsing activity of users to inform decisions about content to provide to the users in future browsing sessions. For example, in a retail website context, a content provider may use past viewing, clicking, adding to cart, and purchasing activity to learn about the user's interest in particular products. That information, known as clickstream or click path data, is used to provide recommendations of new items that the user might be interested in purchasing.

Content providers are faced with a challenge of providing relevant content to new or unidentified visitors of a website. This is often referred to as the "cold start" problem. Without knowing anything about the new or unidentified user, content providers often avoid providing item recommendations or rely on providing generalized recommendations based on which items are most popular on average.

SUMMARY

In summary, the present disclosure relates to methods and systems for presenting item recommendations to new or unidentified users of a website. Previous browsing activity of known users is collected and analyzed to determine which items are most popular according to particular browsing contexts. Contexts may be specified by a time, place, or type of device that the user is using to access the website. The context of the unidentified user is determined and items are recommended to the user based on the context of their browsing of the website. Various aspects are described in this disclosure, which include, but are not limited to the following aspects.

In one aspect, a method of generating item recommendations to an unknown user on a website is provided. An enterprise web server receives clickstream data recorded from known users selecting a plurality of items on the website. The enterprise web server determines a plurality of contexts at which a plurality of items were selected by the known users on the website, wherein each of the plurality of contexts includes at least one context being time-based. Both a context matrix and an item matrix are generated. The context matrix and items matrix are combined to produce a multi-dimensional attribute matrix. Using the combined multi-attribute matrix, affinity scores are calculated for each combination of context and item. A request for a page from the website is received from an unknown user of the website. The page of the website includes an item recommendation region. The context of the unknown user is ascertained. One or more items having affinity scores indicating a highest purchase likelihood given the context of the unknown user. The one or more items are presented to the unknown user within the item recommendation region of the website. In this method, the unknown user is a user for which the enterprise web server lack prior identifiable user-specific preferences.

In another aspect, a non-transitory computer-readable storage medium comprising computer executable instructions is disclosed which, when executed by a computing system, cause the computing system to perform a method of presenting product suggestions to an unidentified customer on a retail website. An unidentified customer is a user for which the enterprise web server lacks prior identifiable user-specific preferences. A click analysis application accesses clickstream data received from identified customers selecting a plurality of items on the retail website. The clickstream data is analyzed to determine a context in which each of the plurality of products was selected by the identified customers on the retail website. A context matrix and an item matrix are generated. The context matrix is combined with the items matrix to produce a multi-dimensional attribute matrix. Affinity scores are calculated for each combination of item and context based on the multi-dimensional attribute matrix. A page request is received from an unidentified customer accessing the retail website. The page includes an item recommendation region. The click analysis application determines a context of the unidentified customer. One or more items having affinity scores indicating a highest purchase likelihood given the context of the unknown user are identified. The one or more items are presented to the unidentified customer on an item recommendation region of the retail website.

In yet another aspect, a system for generating item recommendations to unknown users of a website is described. The system includes an enterprise web server configured to generate and maintain a website accessible by one or more known users and one or more unknown users. The enterprise web server includes at least one processor and a system memory storing instructions. When the instructions are executed by the processor, an item recommendation software application operates to analyze clickstream data received from the one or more known users; identify one or more contexts in which the known users interacted with items on the website, the plurality of contexts including at least one context being time-based; calculate affinity scores for each of a plurality of combinations of items and contexts based on a multi-dimensional attribute matrix; receive page requests from the one or more unknown users, the page including an item recommendation region; identify a context at which an unknown user is accessing the web site; access the affinity scores for the context, and present item recommendations to the unknown user in the item recommendation region of the website, the item recommendations being selected based on the items having the highest conversion rates for known users in that context.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 7A illustrates an example multi-attribute matrix generated in the method of FIG. 6;

FIG. 7B illustrates another view of the multi-attribute matrix of 7A;

FIG. 7C illustrates an example of clustered vectors generated in the method of FIG. 6;

DETAILED DESCRIPTION

Figure 1:
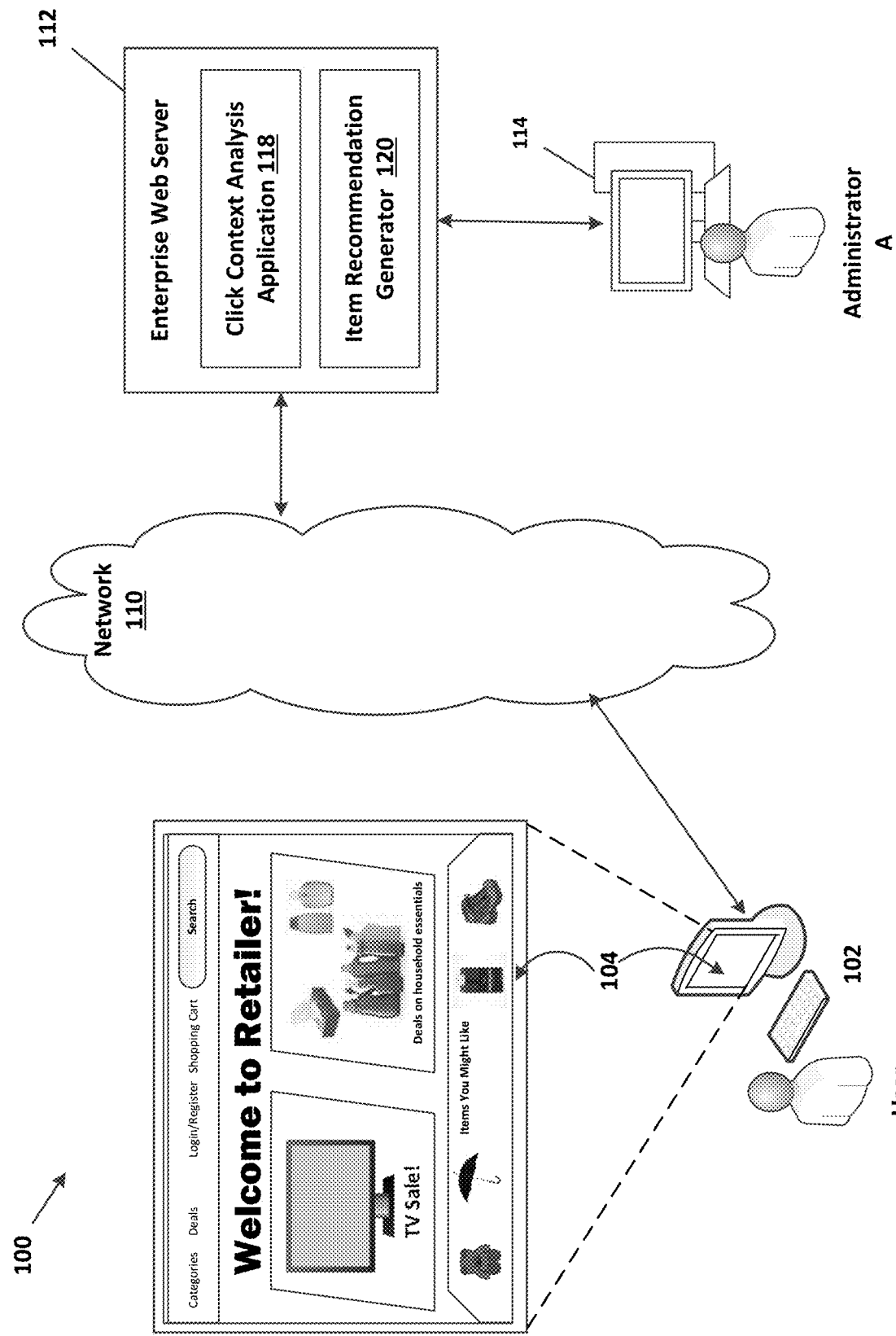
FIG. 1 illustrates a diagram of an example network and system for presenting items recommendations to an unknown user on a website.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Many retail websites try to encourage additional purchases by presenting product recommendations to customers. If there is some browsing history or profile information associated with a user, websites can use that history or information to present recommendations for products that the user is more likely to be interested in purchasing. However, if there is not any browsing history associated with a user (the user is a new visitor to the website) recommendations cannot easily be personalized. This is known as the "cold start" problem. In some cases, when an unidentified user accessed a website, if any recommendations were presented to the user, they were based on overall average interests of previous known users and which products had been most popular on the basis of conversion of views to purchases. The present disclosure provides systems and methods for generating item or product recommendations to new and unidentified users of a website (such as a retail website). Information about the unknown user is gleaned from the context in which the user is accessing the website. For purposes of this disclosure, a "context" generally includes information surrounding a user interaction with a website, and corresponds to any knowable information regarding that interaction. Typically, context can be obtained from website request data and/or cookie data (generally represented by captured clickstream data) and includes one or more of a time, location, and type of device. Times can include: time of day, day of week, time of month, season, or an event. Locations can include: geographic location of the device from which the user is accessing the website, geographic location of the nearest retail store, whether the device is at a residential or business location, and proximity to a given event. Type of device refers to the type of device the user is using to browse the website and can include: smartphone, tablet, laptop, desktop computer, and store kiosk.

Unknown user context information includes only that information that can be obtained from website page requests, such as a device type, location, and time of the request. Known user contexts provide a more complete information profile of the user. Known user contexts include additional information including at least one of: user identity, user age, user gender, past browsing history, past purchase history, user's preferred retail location, user's home address, user income and user household size.

As the unknown user interacts with the website, a clickstream is recorded and additional latent information can be learned about the user. A clickstream is a series of mouse clicks made by a user while using one or more websites, recording the user's activity. In some aspects, the context combined with user activity on the website can be analyzed to learn more about the user. As more and more information is gathered about the new user, item recommendations are fine-tuned based on the new user's browsing activity.

A new user's context is used to generate item recommendations by examining the items that are most popular with previous known users that access the website in the same context. The recommendations are prepared for viewing on an item recommendation region of a landing page or entry page of a website so that they can be viewed when the new user first accesses the website. For example, in a situation where an unknown user is accessing a retail website on a smartphone in the evening on a weekday, in a particular zip code, the system will access information about the browsing activity of known users that were also accessing the retail website on a smartphone in the evening on a weekday in that zip code. The known users' activity (or returning visitor's activity) is analyzed by examining clickstreams to determine which items the known users most often interacted with by viewing, adding to a shopping cart, and purchasing.

In some cases, the impressions on a website are also recorded, where impressions are a number of times an item is seen on a website. A point value may be assigned to each type of activity. For example a product view could be 2 points, adding to a shopping cart could be 5 points, and purchasing a product could be 10 points. A score is calculated for each item and each context combination. The scores are then used to generate the best item recommendations for the new user based on their context. The best items to recommend are those expected to result in conversion from view to sale.

Referring first to FIG. 1, a diagram of an example system 100 for recommending items on a website is illustrated. In the example shown, a user computing device 102 displays an example user interface 104 which is presented to a user U. The user U interacts with the user interface 104 through inputs and outputs of the computing device 102. The user U, in some examples, is a customer browsing a retail website. The computing device 102 connects through a network 110 to an enterprise web server 112. The network 110 can be any of a variety of types of public or private communications networks, such as the Internet. The enterprise web server 112 functions to provide a website accessible through the network 110 by the one or more devices 102. In some examples the website is a retail website that allows the users to view information about items for sale and to make purchases. In the embodiment shown, an administration computing device 114 is operated by an administrator A and communicates with the enterprise web server 112. In the embodiment shown, the enterprise web server 112 includes a click context analysis application 118 and an item recommendation generator 120, which are described further in FIGS. 3 and 4. The computing devices 102, 114 can include desktop computers, laptop computers, tablet computing devices, and smartphones.

Figure 2:
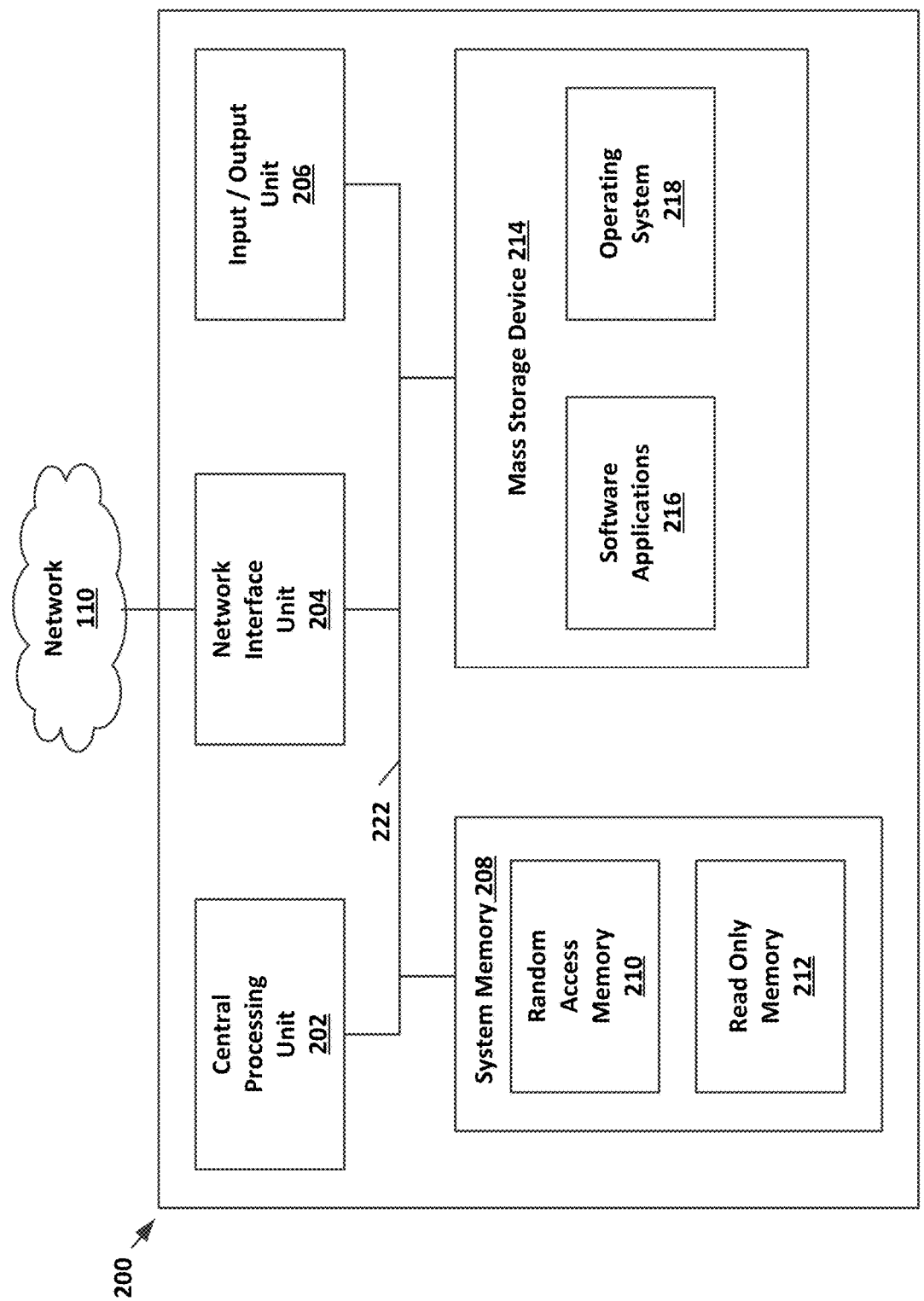
FIG. 2 illustrates an example block diagram of a computing system useable in the context of FIG. 1.

Referring now to FIG. 2, an example block diagram of a computing system 200 is shown that is useable to implement aspects of the system 100 of FIG. 1. The computing system 200 can be used to implement, for example, the computing systems 102 or 114 of FIG. 1, in example aspects.

In the embodiment shown, the computing system 200 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing system 114, such as during startup, is stored in the ROM 212. The computing system 200 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable storage media provide non-volatile, non-transitory data storage for the computing system 200. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through a network 110, such as a wireless network, the Internet, or another type of network. The computing system 200 may connect to the network 110 through a network interface unit 204 connected to the system bus 222. It should be appreciated that the network interface unit 204 may also be utilized to connect to other types of networks and remote computing systems. The computing system 200 also includes an input/output unit 206 for receiving and processing input from a number of other devices, including a touch user interface display screen, or another type of input device. Similarly, the input/output unit 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software applications 216, that when executed by the CPU 202, cause the computing system 200 to provide the functionality of the computing systems 102, 114 discussed in this document.

Figure 3:
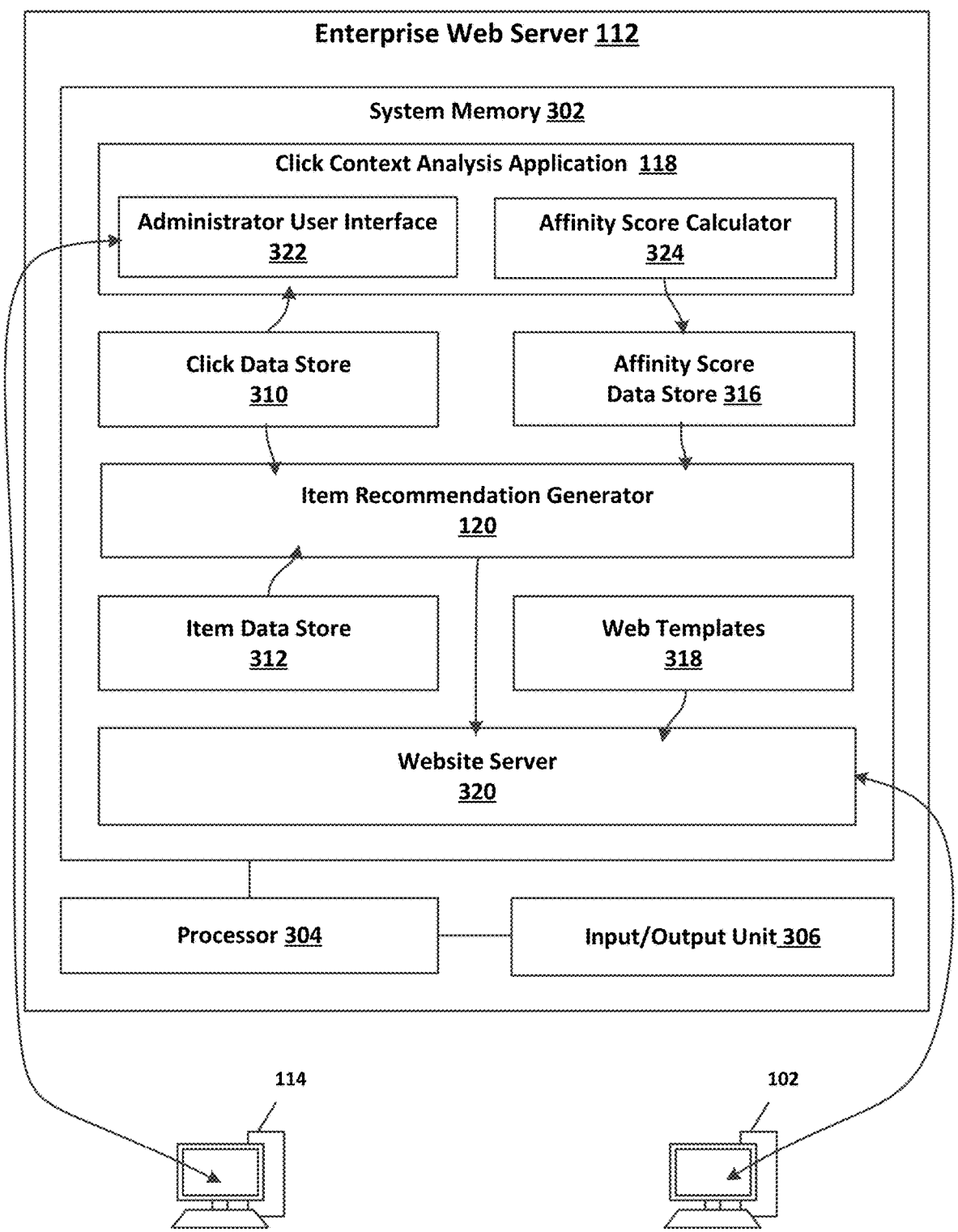
FIG. 3 illustrates an example block diagram of the enterprise web server of FIG. 1.

FIG. 3 illustrates a more detailed schematic diagram of the enterprise web server 112 of FIG. 1. In the embodiment shown, the enterprise web server 112 includes a system memory 302, operatively connected to a processor 304 and an input/output unit 306.

In the example embodiment shown, the system memory 302 includes a click context analysis application 118, an item recommendation generator 120, a click data store 310, an item data store 312, an affinity score data store 316, web templates 318, and a website server 320. The software modules are implemented as discussed below.

The click context analysis application 118 operates to analyze clickstream data received from known or identified users accessing the web site operated by the enterprise web server 112. The click context analysis application 118 generates affinity scores for items based on user context.

The click context analysis application 118 of FIG. 3 includes an administrator user interface 322 and an affinity score calculator 324. The administrator user interface 322 is configured to communicate with one or more administrator computing devices 114. The user interface 322 can be utilized by an administrator user to adjust parameters of the click context analysis application 118. In particular, the administrator user can adjust algorithms and methods utilized by the affinity score calculator 324 in order to optimize the item recommendations that are ultimately generated from the affinity scores. In some embodiments, the user interface 322 can also be used to display a dashboard for monitoring and analyzing impressions, such as the dashboard described in co-pending application, which is hereby incorporated by reference in its entirety.

In one embodiment the click context analysis application 118 analyzes clickstream data from known users to identify context information about the browsing activity associated with the clicks. Context information can include time, date, geographic location, and type of device.

In some embodiments, the context information is utilized to categorize different combinations of time, place, and device into different context profiles or "user personas". Each context profile is defined by one or more times, places, and devices. For example, one context profile could be accessing the website on a smartphone at 10 a.m. in the downtown area of a city. This context profile could reflect a user browsing items on their smartphone during a break at work to inform their shopping plans for that evening. In another example a context profile could be accessing the website on a desktop computer in a suburban area at 7 p.m. This context profile could reflect a user accessing the web site to order goods for delivery.

In some embodiments, the context information is tracked over time to capture patterns in user shopping behavior. Shopping activity on the website can be categorized as routine, home, work or school, commute, exercise or play, screen time, or relaxation. The urgency of the shopping activity can be categorized as quick and urgent, shopping for a particular item, predefined lists, and impulse buying. Customers can also be categorized by purchase cycle which includes active purchase, immediate needs, deal hunting, comparison shopping, and passive shopping. In some instances, sample user profiles are created based on particular contexts. Such "draft personas" may include convenience shopper, deal hunter, organized shopper, inspiration seeker, and holiday shopper.

The affinity score calculator 324 utilizes matrix factorization and k-means clustering to calculate affinity scores. A score is calculated for each combination of item and context possible for the website based on the known user clickstream data. Scores are predicted for combinations of items and contexts where there is not clickstream data to support the combination. Bayesian methods are used to avoid overfitting the data. Once the affinity score calculator 324 calculates scores for every pair of item and user context, the scores are output to the affinity score data store 316.

The item recommendation generator 120 operates to identify items to recommend to users of the website. In the case of known or identified users, the item recommendation generator 120 uses past browsing activity to inform decisions about which items to recommend to the known users. Past clickstream activity of each identified user is utilized to present new item recommendations. In the case of unknown or unidentified users, the item recommendation generator 120 relies on information generated by the click context analysis application 118. The click analysis application 118 operates to analyze clickstream data of known users and draw conclusions about which items or types of items are most popular with users based on the particular context in which the user is accessing the website.

The click data store 310 stores clickstream data received from known users of the website. The click data store 310 is accessed by the click analysis application 118. Clickstream data includes page requests that are made on a website by a user. Each page request generates a signal representing human clicks. Tracking cookies are used to record click path data. Cookies are text files placed on a user's computer to track the user's activity while browsing a website. The click data store 310 is accessed by both the click context analysis application 118 and the item recommendation generator 120.

The item data store 312 stores information about items that are available to present or display on the website. The information can include attributes of items such as size, price, color, etc. The item data store 312 can also store images or videos of available items. In examples where the website is a retail website, the items are products that are available for sale through the website. The item data is accessed by the item recommendation generator 120 and the website server 320.

The affinity score data store 316 operates to store scores that are generated by the affinity score calculator 324 of the click analysis application 118 for each combination of item and context at which known users have clicked or interacted with an item. Predicted scores are stored for item/context combinations that were not found in the known user clickstream data. The item is accessed by the item recommendation generator 120 when an unknown or unidentified user accesses the website. The score stored in the affinity score data store 316 informs decisions made by the item recommendation generator 120 for presenting items or products to a new user of the website.

The web templates 318 store templates that are accessed by the website server 324 when presenting a user interface to a user or customer on the website. Web templates provide a visual outline for a website that can be modified with detailed information. Web templates may include an item recommendation region designated for presenting item or product recommendations.

The website server 320 operates to generate and present to a plurality of users a user interface for accessing information associated with the website.

Figure 4:
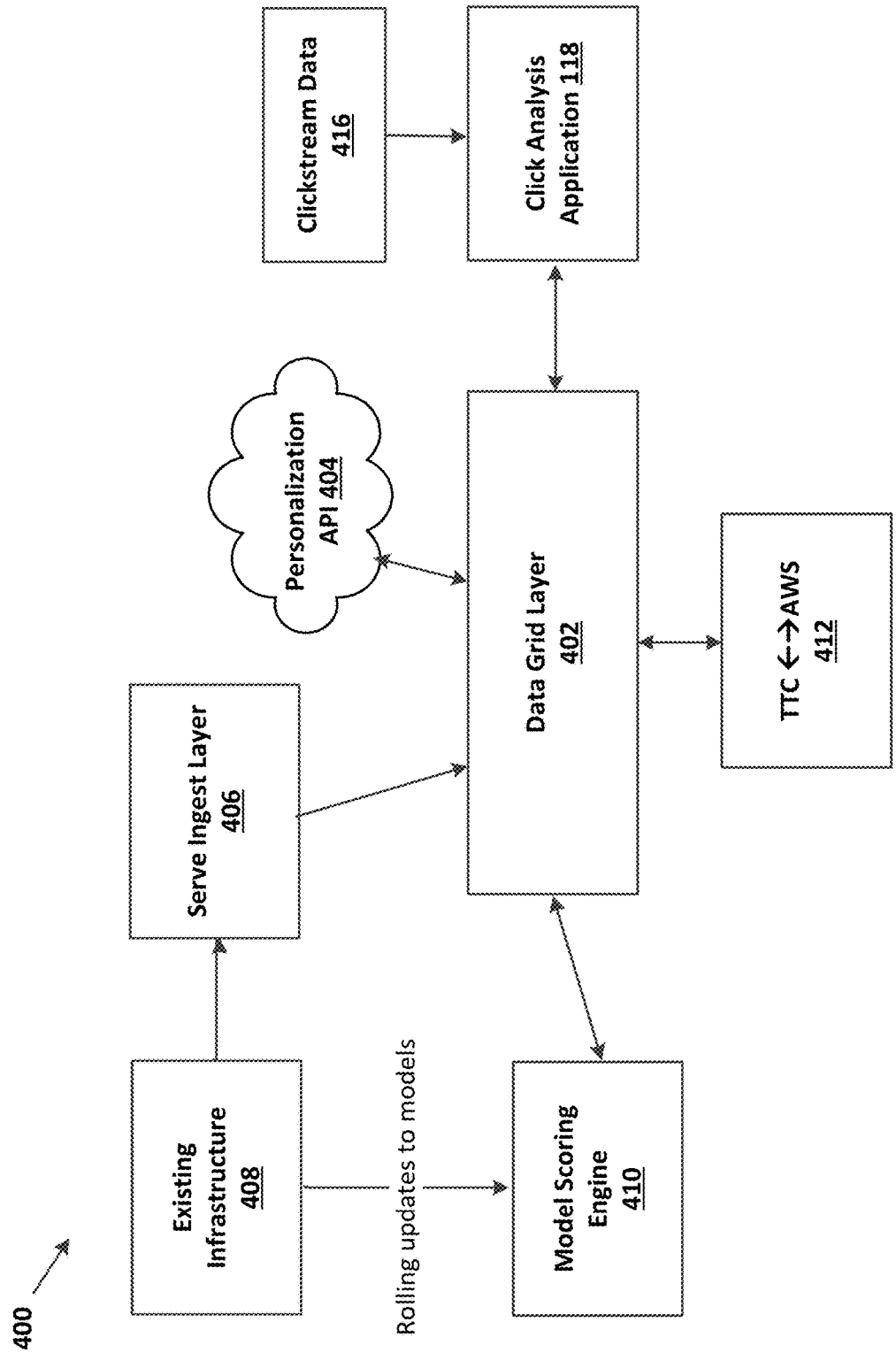
FIG. 4 illustrates an example block diagram of a system useable to generate and assess effectiveness of item recommendations.

Referring now to FIG. 4, a block diagram illustrating an example particular implementation of a system 400 useable to generate and assess effectiveness of item recommendations as described herein is provided. In particular, the system 400 is useable to process website activity, such as clickstream activity, and process that information in near-realtime. The real-time information is used to determine how a user responded after seeing a recommendation. For example, after a user has seen a first recommended item 20 times, the user clicked on the item only twice versus a second recommended item that was seen 10 times and clicked 5 times.

The data grid layer 402 receives impression and sales information, and provides a compute space for calculating user and item matrices, as further discussed below. The personalization API 404 provides an interface to view personalization information, for example via a management user interface. The serve ingest layer 406 stages data received from existing infrastructure 408, which includes existing web services infrastructure for both web and mobile user interfaces. The model scoring engine 410 will receive models from the data grid layer 402, and will receive rolling updates from existing infrastructure to allow for assessment of the models built using the data grid layer 402. In some embodiments, the model scoring engine 410 can initiate a periodic refresh of models via the data grid layer; in other embodiments, the data grid layer 402 automatically updates models at a predetermined periodicity, to be provided to the model scoring engine. The model scoring engine 410 can also receive rolling updates to models from the existing infrastructure 408, for example to determine an appropriate time at which to update a specific model (e.g., in the instance a model becomes less effective in generating accurate item recommendations).

Clickstream data 416 is received at the click analysis application 418 for processing. The clickstream data 416 may be communicated to the data grid layer 402, where it can be accessed and utilized by other applications. The click analysis application 418 operates to analyze the clickstream data 416 for at least the purpose of providing item recommendations on a website. In some aspects, the click analysis application 418 can process the clickstream data 416 in order to generate reports, compare clicks with purchases, etc. The click analysis application 418 may operate in the same manner as the click context analysis application 118 of FIGS. 1 and 3.

Figure 5:
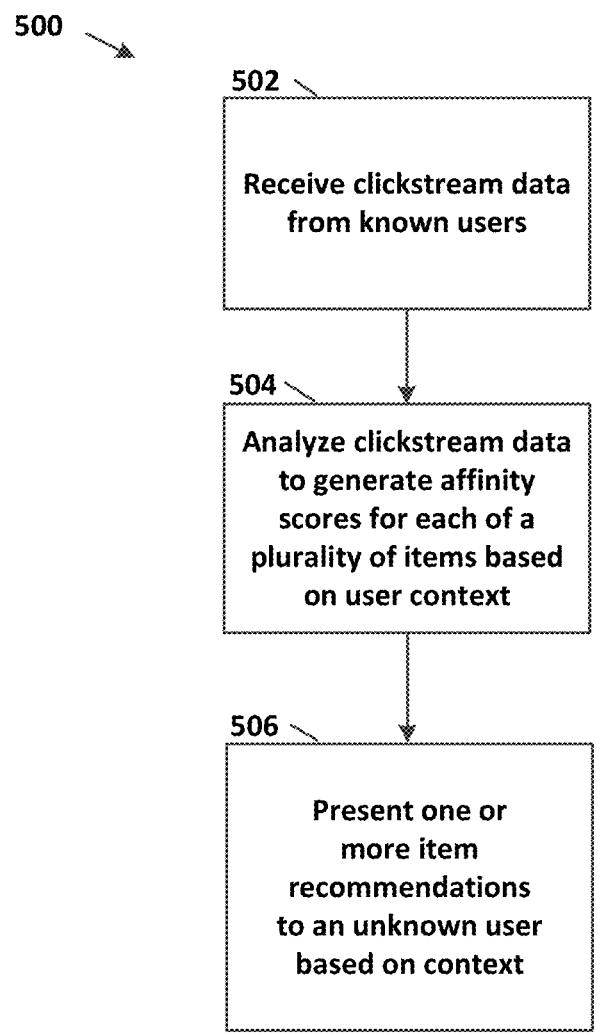
FIG. 5 illustrates an example method of generating item recommendations to unknown users.

FIG. 5 illustrates an example method 500 of generating item recommendations to unknown users based on context. The method 500 provides an overview of how a web server, such as the enterprise web server 112 of FIG. 1, can be utilized to present personalized recommendations to users of a website, even if the users are unknown.

At operation 502, clickstream data is received from known users. In some embodiments, clickstream data is received at a click analysis application such as the click context analysis application 118 of FIG. 3. In some embodiments, clickstream data is immediately stored in a data store such as the click data store 310 of FIG. 3. The clickstream data includes page views, purchases, and other interactions that a known user has made with a web site. Clickstream data of interest pertains to particular items that are presented on the website. The clickstream data also includes information about the time, place, and device at which the clicks occurred.

At operation 504, the clickstream data is analyzed in order to generate scores for each of a plurality of items based on user affinity. In some embodiments, the click analysis application 118 performs this analysis using matrix factorization along with k-means clustering on a user vector based on context. The clickstream data analysis process is further described with respect to FIG. 6.

At operation 506, one or more item recommendations are presented to an unknown user based on the unknown user's context. An item recommendation generator, such as the item recommendation generator 120 of FIG. 3, utilizes affinity scores to predict which items an unknown user will be most likely to purchase. Items are selected from context-based clusters of items based on which, on average, have the best conversion rates of views to sales. The recommendation presenting process is further described with respect to FIGS. 8-10.

Figure 6:
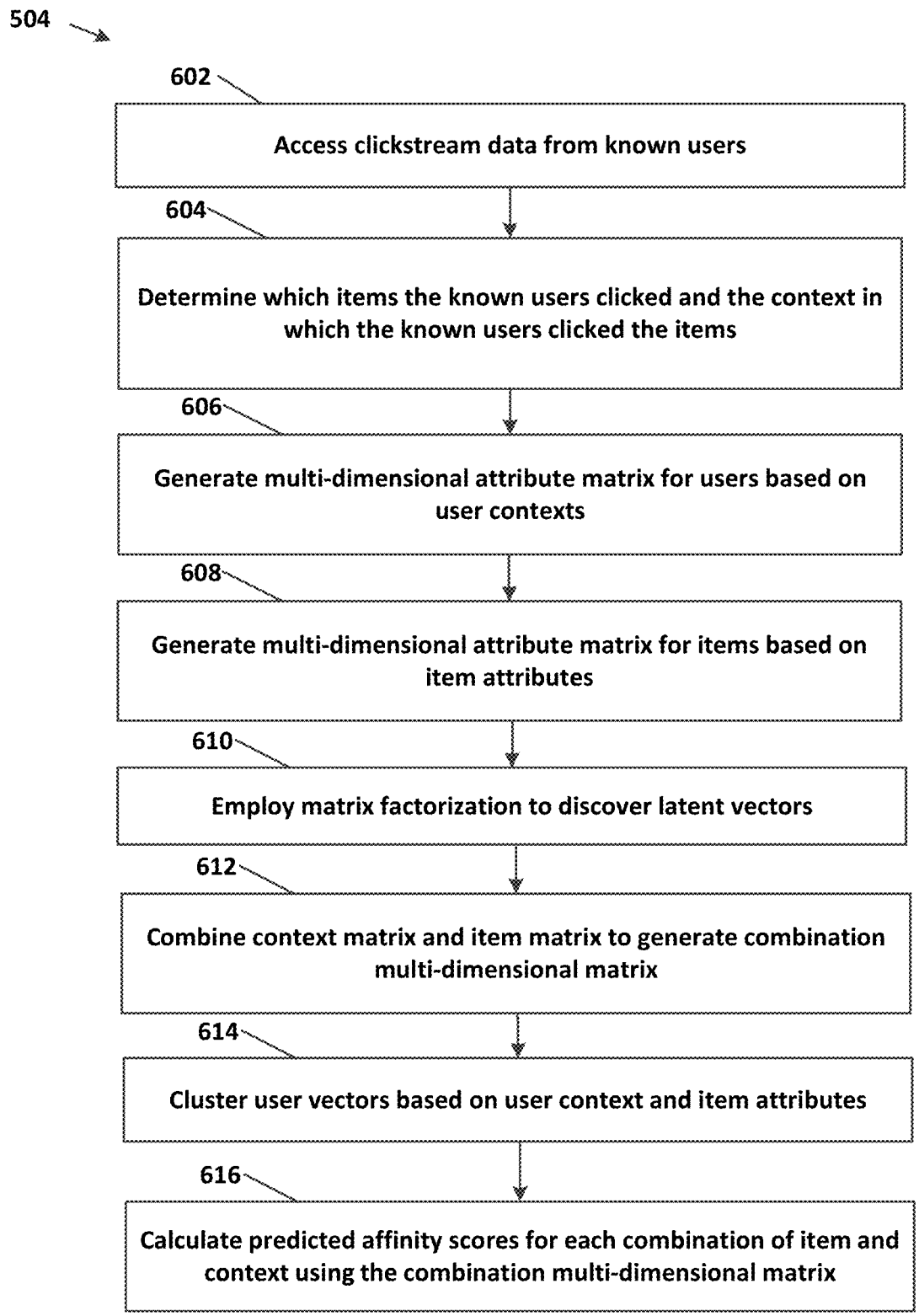
FIG. 6 illustrates an example method of analyzing clickstream data from known users to generate predicted affinity scores for item-context combinations.

FIG. 6 illustrates an example method 504 of analyzing clickstream data of known users to calculate affinity scores for items based on user context. In some embodiments, the method 504 is performed by an application such as the click context analysis application 118 operating as part of the enterprise web server 112 of FIG. 3.

At operation 602, clickstream data from known users is accessed. In some aspects, the clickstream data is accessed from a click data store 310 by a click context analysis application 118. In other embodiments, the clickstream data may be received continuously or in batches as it is generated by known users.

At operation 604, the click context analysis application 118 determines which items the known users clicked. The click represents interaction with the item such as viewing, saving, adding to a shopping cart or bag, and purchasing. The click context analysis application 118 also determines a context in which the user clicks occurred. The context includes one or more of a time, place, and type of device at which the website was accessed.

At operation 606, a multi-dimensional attribute matrix is generated by the click context analysis application 118. The matrix is generated for users based on user contexts. At operation 608, a similar multi-dimensional attribute matrix is generated for items based on item attributes.

At operation 610, matrix factorization is employed to discover latent vectors for context. Latent vectors are values or information for a user that is not directly received from the user, but instead is indirectly observed. In this instance, the latent vectors are the context of the users as they are interacting with various items on a website. Latent vectors are also discovered for the items based on their attributes. The vectors are utilized to calculate affinity scores.

At operation 612, the context matrix from operation 606 and the item matrix from operation 608 are combined into a combination multi-dimensional matrix. The combination multi-dimensional matrix includes values representing interactions that have occurred between users and items on the website.

In the example of FIG. 7A, the interactions are logged as "view," "A2C" (add to cart), or "buy." The matrix 700 shown in FIG. 7A plots users 702 against items 704 and the labeled interactions 706 appear in the table. In FIG. 7B, the logged interaction labels are replaced with numerical values.

In this example, views are worth 2 points, adding to cart is worth 5 points, and purchasing is worth 10 points. The combination multi-dimensional matrix includes values for item/context combinations that actually occurred in the clickstreams of known users. For combinations of items and contexts where there was not a click from known users, a "blank" space or zero would hold the place of a value.

Returning to FIG. 6, at operation 614, the user vectors are clustered on common attributes of the user context at which clicks occurred. K-means clustering is utilized to group common vectors together. An example of vector clusters is shown in FIG. 7C. In the table 710 shown, latent vectors U 712 and latent vectors V 714 are clustered into three clusters 716. Affinity scores 718, 720 define affinities with items (represented by products P1-P10) associated with each user and context, respectively.

Returning to FIG. 6, at operation 616, predicted affinity scores are calculated for each combination of item and context using the combination multi-dimensional matrix. In some embodiments, the affinity scores are calculated using the following equation:

$$\min_{q*,p*} \sum_{(u,i) \in \kappa} (r_{ui} - q_i^T p_u)^2 + \lambda(\|q_i\|^2 + \|p_u\|^2)$$

In this equation, u is a user matrix, $p_u$ is a user vector for a particular user "u." $q_i$ is an item vector and $r_{ui}$ is the affinity score. K is the set of the (u,i) pairs for which $r_{ui}$ is known (based on the clickstream data of known users). Bayesian methods are applied to avoid overfitting the data. The affinity scores may be stored in a data store such as the affinity score data store 316, for later use.

Figure 8:
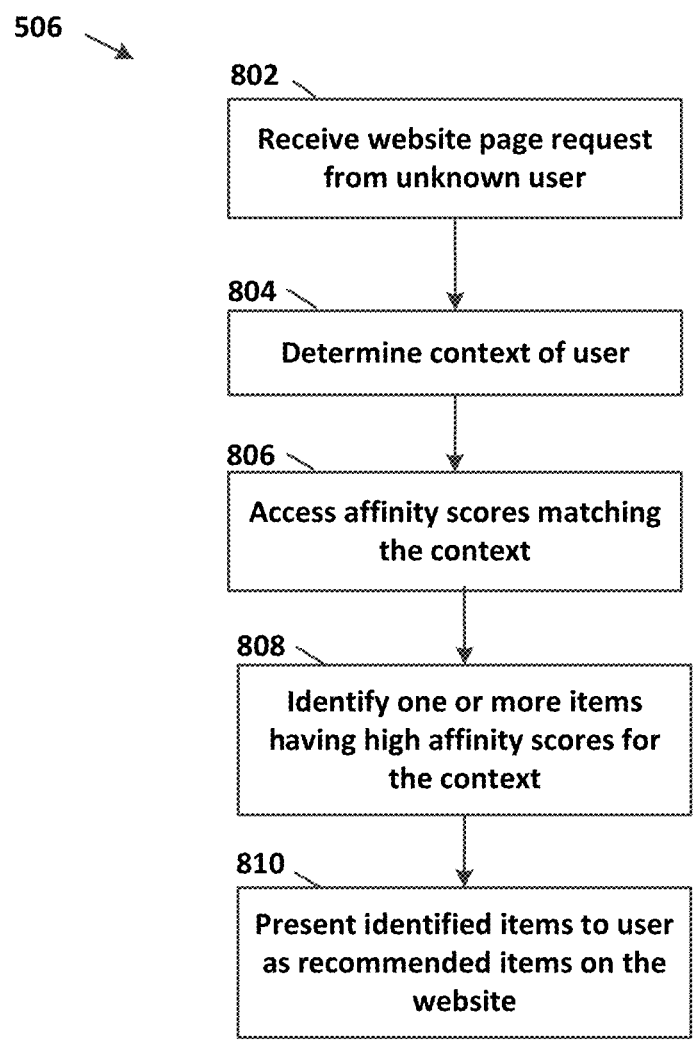
FIG. 8 illustrates an example method of presenting item recommendations to an unknown user based on context.

FIG. 8 illustrates an example method 506 of identifying and presenting item recommendations for an unknown user. In some embodiments, this method 506 performed by the item recommendation generator 120 of FIG. 1.

At operation 802, the enterprise web server 112 receives a website page request from an unknown user. An unknown user is a user for which the enterprise web server lacks prior identifiable user information. The website server 320 receives the page request for the unknown user and communicates that page request to the item recommendation generator 120 in order to generate item recommendations to fill the item recommendation region of a web template.

At operation 804, the context of the unknown user is determined. Information about the time, location, and type of device the unknown user is accessing the website from is received at the website server 320 and is communicated to the item recommendation generator 120. In some embodiments, the context of the unknown user is matched to a sample "persona" before selecting item recommendations.

At operation 806, the item recommendation generator 120 matches the unknown user's context to affinity scores in the affinity score data store 316. The match is made based on a context cluster of items. The affinity scores matching the context are accessed and analyzed.

At operation 808, the item recommendation generator 120 utilizes the affinity scores to identify one or more items in the item data store 312 to recommend to the unknown user. The affinity scores represent the likelihood that a user in a particular context will be interested in purchasing a particular item based on its attributes. The items selected are preferably those that, on average, have the highest conversion rates within the context cluster.

At operation 810, the item recommendation generator 120 communicates the identified items to the website server 320. The website server 120 utilizes web templates 318 to generate a user interface for interacting with the website. A portion of a web template includes an area where item recommendations can be presented. The website server 320 inserts the identified items into the item recommendation region of the web template. The recommended items are then presented for the unknown user to view.

Figure 9:
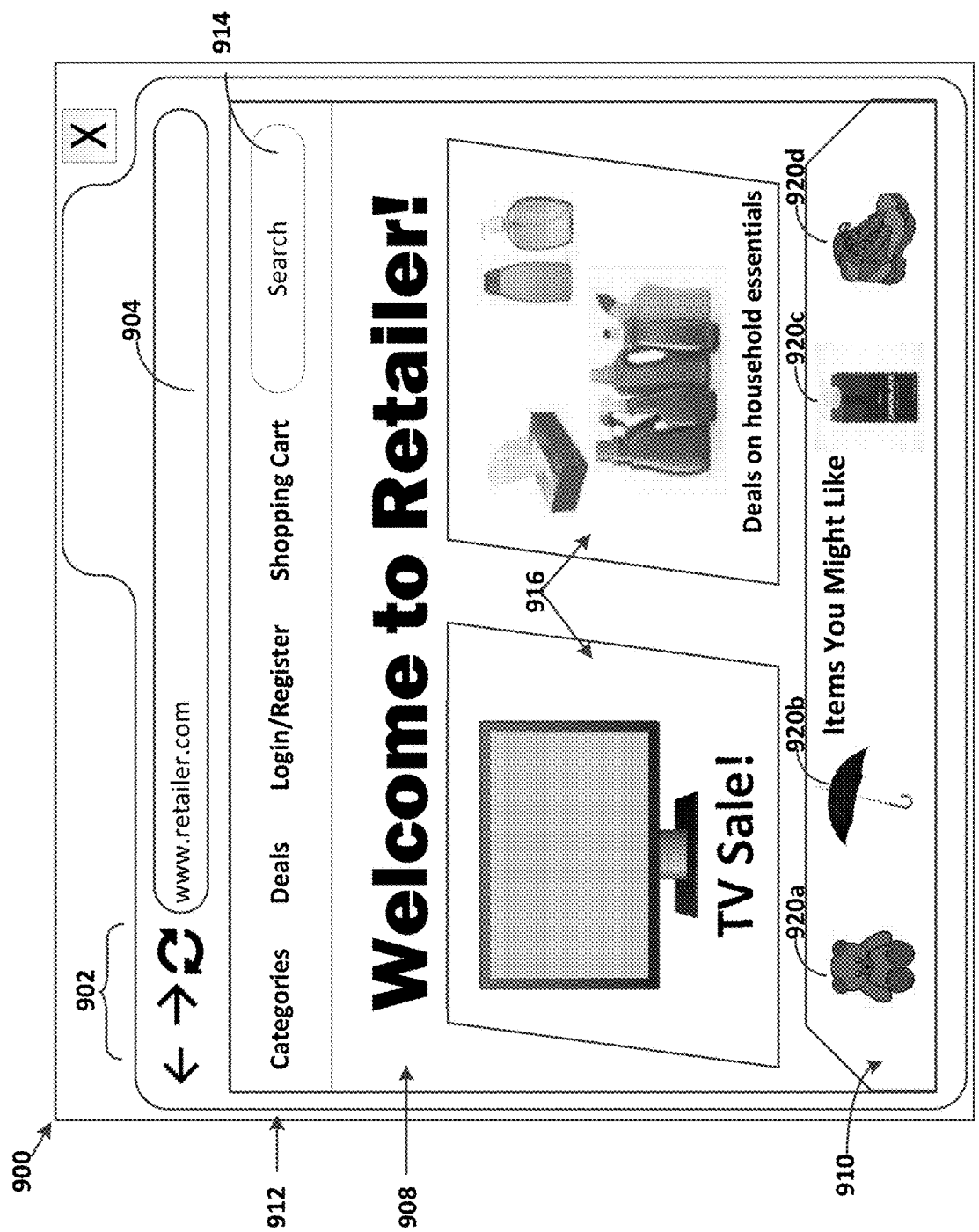
FIG. 9 illustrates an example embodiment of a website presenting item recommendations to a user.

FIG. 9 illustrates an example web browser 900 displaying the landing page of a retail website 908. The web browser 900 is shown with navigation buttons 902 and an address bar 904. Here the address bar indicates that the website displayed is www.retailer.com. The website 908 displays graphical links 916 to sales and categories of items. An item recommendation region 910 is displayed including "Items You Might Like." A series of items 920a, 920b, 920c, 920d are displayed as recommended items for the user. In this example, the user of the website is an unknown or unidentified visitor to the website. Items displayed as being recommended to the unknown user were determined by the process described in FIGS. 5-8.

Figure 10:
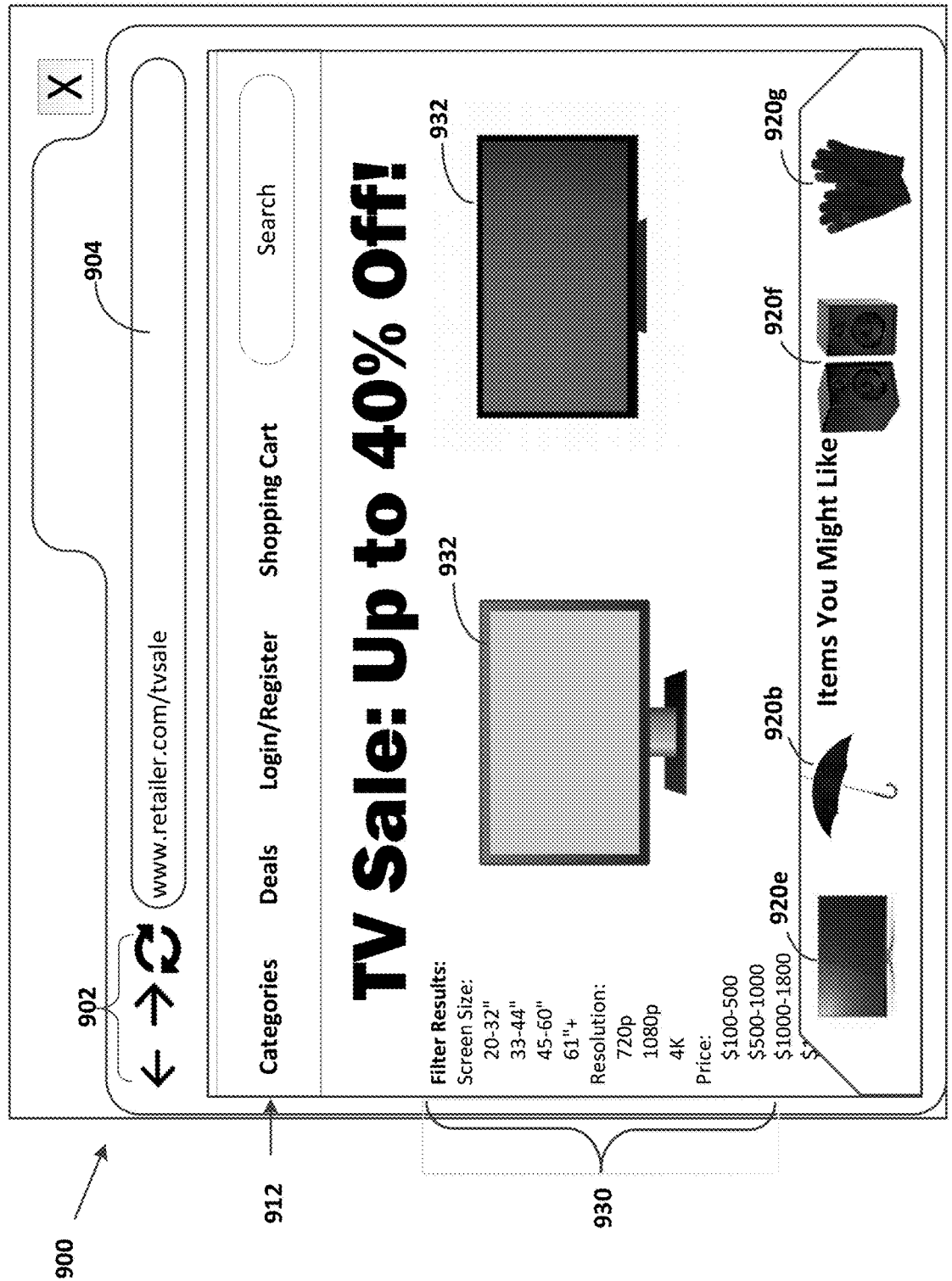
FIG. 10 illustrates another view of the website of FIG. 9.

In some embodiments, clickstream data is received from an unknown user of a website as the unknown user begins to interact with content on the website. This clickstream data is used to further refine item or product recommendations that are presented to the user. In the example of FIGS. 9-10, the unknown user has selected the graphical link 916 for the "TV Sale!" shown on the website 908 of FIG. 9. FIG. 10 shows another display of the website where multiple TVs 932 are displayed for the user. Options to filter 930 the TV offerings are displayed. In response to the unknown user's click, the system has updated the recommended items 920 displayed on the website. Item 920a from FIG. 9 has been replaced with item 920e. Other items 920f and 920g are presented based on the unknown user's activity on the website in order to present more relevant item recommendations to the user.

In some embodiments, the same item recommendations will be presented multiple times as the user navigates through pages of the website. The item recommendations may switch to the next highest scoring items if the top highest scoring items that were initially presented are not clicked on by the unknown user. As the unknown user interacts with the website, the system "learns" more about the user and can provide more relevant item recommendations. This creates a feedback loop where the item recommendation generator 112 continually improves the item recommendations for the user as more information is gathered about the user.

In some embodiments, the system and methods recommend item categories rather than individual items. Similar processes are used to determine which categories of items an unknown user might be most interested in purchasing based on their context.

In some embodiments, the system and methods further rely on information gathered about the unknown or unidentified users from external, third party sources. For example, cookies stored on the unknown user's device could be accessed to ascertain further context information about the unknown user. Such information could be gathered from social media websites, other retail websites, or general browsing habits. The cookies may be scrubbed of personal identifying information before processing at the enterprise web server. The cookies can be anonymized and data can be aggregated to avoid the risk of exposing sensitive personal information about individuals.

In accordance with the present disclosure, the systems and methods provided herein have a number of advantages over existing recommendation generation systems and related user interfaces. For example, because data used to establish recommendations is from known users, recommendations for similar unknown users can be made highly accurately. Furthermore, because models of latent factors for known users allow for derivation of types of known users (e.g., purchasers of items for immediate need, vs. deal hunting or comparison shopping) e.g., based on time of day or other latent factors, more particular recommendations may be made. Still further, because the item recommendations of the present application draw from user data across a plurality of different types of user sessions (e.g., website interactions, mobile application interactions, multiple sessions), richer context can be established, resulting in increased accuracy of recommendations for unknown users. Still further, because the matrices used in forming affinity scores are based on realtime click stream data, such affinity scores can be quickly updated, allowing for shortened time to improved recommendations being generated by the website.

Generation of improved item recommendations provides greater efficiency to computing devices used to generate and host a website, as well as to computing device used to access the website. By providing more relevant item recommendations, fewer pages of the website need to be presented to a user in order to result in a purchase being made. A user will, on average, click fewer items and pages of a website in order to find relevant items to purchase. This reduces the processing burden of all computing devices involved.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of generating item recommendations to an unknown user on a website implemented on an enterprise web server comprising a system memory operatively connected to a processor, the method comprising:
  receiving, at the enterprise web server, clickstream data recorded from known users selecting a plurality of items on the website;
  determining, with a click context analysis application, a plurality of contexts at which the plurality of items were selected by the known users on the website, the plurality of contexts including at least one context being time-based;
  calculating, using a data grid layer operating in conjunction with the click context analysis application, affinity scores for each combination of context and item by:
    generating, at the click context analysis application, a context matrix for combinations of known users and contexts within the data grid layer;
    generating, at the click context analysis application, an item matrix for combinations of known users and selected items within the data grid layer;

combining, at the click context analysis application, the context matrix with the item matrix to produce a multi-dimensional attribute matrix within the data grid layer;
assigning values to the combinations of items and contexts for which there is clickstream data based on a type of interaction,
employing matrix factorization and clustering at the click analysis application to calculate predicted values for combinations of items and contexts for which there is not clickstream data; and
storing the affinity scores in a data store;
receiving, at the enterprise web server, a request for a page from the website from the unknown user of the website, the page including an item recommendation region;
ascertaining, with an item recommendation generator, a context of the unknown user based on the request including at least a time of the request;
identifying, with the item recommendation generator, one or more items having affinity scores indicating a highest purchase likelihood given the context of the unknown user; and
presenting the one or more items to the unknown user within the item recommendation region of the website, wherein the one or more items presented based on the affinity scores are derived from the predicted values for the items in the ascertained context rather than an average value based on all known user activity,
wherein the unknown user comprises a user for which the enterprise web server lacks prior identifiable user-specific preferences.

2. The method of claim 1, wherein the prior identifiable user-specific preferences come from one or more of: browsing history, user registration, link to prior user in-store purchases, and $3^{rd}$-party browsing history.

3. The method of claim 1, wherein the context includes one or more of a time of day, a day of the week, a time of month, and a season.

4. The method of claim 3, wherein the context further includes at least one of a geographic location and a device type.

5. The method of claim 1, wherein the clickstream data comprises views, favorites, adds to shopping cart, and purchases.

6. The method of claim 1, wherein the clustering is performed using k-means methods.

7. The method of claim 1, further comprising applying a Bayesian method to score probabilities and avoid overfitting.

8. The method of claim 1, further comprising receiving clickstream data from the unknown user interacting with the website and updating the item recommendations presented to the unknown user based on the context and the clickstream data.

9. The method of claim 8, further comprising, based on the one or more items in the item recommendation region not being selected by the user within a predetermined amount of time, in response to a subsequent request for the page from the unknown user, presenting a different set of one or more items within the item recommendation region.

10. The method of claim 9, wherein the different set of one or more items includes an updated set of items selected to include items having a purchase likelihood higher than other items not previously included in the item recommendation region but excluding at least one item from among the one or more items.

11. The method of claim 1, wherein known user contexts include additional information including one or more of: user identity, user age, user gender, past browsing history, past purchase history, user's preferred retail location, user's home address, user income and user household size.

12. The method of claim 1, wherein the website is a retail website and the items are products for sale.

13. A non-transitory computer-readable storage medium comprising computer-executable instructions which, when executed by a computing system, cause the computing system to perform a method of presenting item suggestions to an unidentified customer on a retail web site, the method comprising:
accessing, by a click analysis application, clickstream data received from identified customers selecting a plurality of items on the retail web site;
analyzing the clickstream data to determine a context in which each of the plurality of items was selected by the identified customers on the retail web site;
calculating, using a data grid layer operating in conjunction with the click context analysis application, affinity scores for each combination of context and item by:
generating, with the click context analysis application, a context matrix for combinations of identified customers and contexts within the data grid layer;
generating, with the click context analysis application, an item matrix for combinations of identified customers and selected items within the data grid layer;
combining the context matrix with the items matrix to produce a multi-dimensional attribute matrix;
assigning values to the combinations of items and contexts for which there is clickstream data in the multi-dimensional attribute matrix based on a type of interaction, and
employing matrix factorization and clustering at the click context analysis application to calculate predicted values for combinations of items and contexts for which there is not clickstream data; and
storing the affinity scores in a data store;
receiving, at an enterprise web server, a page request from the unidentified customer accessing the retail web site, the page including an item recommendation region;
determining, with an item recommendation generator, a context of the unidentified customer based on the request including at least a time of the request;
identifying, with the item recommendation generator, one or more items having affinity scores indicating a highest purchase likelihood given the context of the unidentified customer; and
presenting the one or more items to the unidentified customer within the item recommendation region of the retail website,
wherein the one or more items presented based on the affinity scores are derived from the predicted values for the items in the ascertained context rather than an average value based on all known user activity, and
wherein the unidentified customer comprises a user for which the enterprise web server lacks prior identifiable user-specific preferences.

14. The non-transitory computer-readable storage medium of claim 13, wherein a context includes a time, a location, and a device.

15. The non-transitory computer-readable storage medium of claim 13, wherein the instructions further cause the computing system to perform: receiving clickstream data from the unidentified customer and updating the item recommendations presented to the unidentified customer based on the context and the clickstream data.

16. A system for generating item recommendations to present to users of a web site, the system comprising:
   an enterprise web server configured to generate and maintain a web site accessible by one or more known users and one or more unknown users, the enterprise web server comprising:
      at least one processor; and
      a system memory storing instructions that, when executed by the at least one processor, cause the enterprise web server to:
   analyze clickstream data received from the one or more known users at a click context analysis application;
   identify, with the click context analysis application, one or more contexts in which the one or more known users interacted with items on the website, the plurality of contexts including at least one context being time-based;
   calculate, using a data grid layer operating in conjunction with the click context analysis application, affinity scores for each combination of context and item by:
      generating a context matrix for combinations of known users and contexts within the data grid layer;
      generating an item matrix for combinations of known users and items within the data grid layer;
      combining, at the click context analysis application, the context matrix with the item matrix to produce a multi-dimensional attribute matrix;
      assigning values to the combinations of items and contexts for which there is clickstream data based on a type of interaction;
      employing matrix factorization and clustering at the click context analysis application to calculate predicted values for combinations of items and contexts for which there is not clickstream data; and
      saving the affinity scores to a data store;
   receive a page request from the one of the one or more unknown users at the enterprise web server, the page including an item recommendation region;
   identify a context at which the one unknown user is accessing the web site, the context including a time of the page request;
   access the affinity scores for the context from the data store;
   generate, at an item recommendation generator, item recommendations including one or more items having affinity scores indicating a highest purchase likelihood given the context of the one unknown user; and
   present item recommendations to the one unknown user in the item recommendation region of the website, the item recommendations being selected based on predicted values for the items in the ascertained context rather than an average value based on all known user activity.

17. The system of claim 16, wherein the web site is a retail website offering products for sale.

18. The system of claim 16, wherein the one or more known users are customers having an account registered with the web site and the one or more unknown users are new visitors to the retail website.

19. The system of claim 18, wherein the known user contexts include additional information including at least one of: user identity, user age, user gender, past browsing history, past purchase history, user's preferred retail location, user's home address, user income and user household size.

20. The system of claim 18, wherein the unknown user contexts only include information that can be obtained from the page request.

21. The system of claim 16, wherein the system further comprises at least one administrator computing device configured to adjust one or more parameters applied to the click analysis application.

22. The system of claim 21, wherein the at least one administrator computing device communicates with the click analysis application through a personalization application programming interface (API).

23. The system of claim 22, wherein the personalization API communicates with the click analysis application through a data grid layer, the data grid layer configured to receive impression and sales data.

24. The system of claim 16, wherein a context can be obtained from one or more of website request data and cookie data.

25. The system of claim 16, wherein the enterprise web server further comprises a click data store configured to store clickstream data received from users.

26. The system of claim 16, wherein the enterprise web server further comprises an affinity score data store configured to store calculated scores for combinations if items and contexts.

* * * * *